2,947,675
STYRENE POLYMERIZATION PROCESS

Daniel S. Maisel, Union, and Donald A. Guthrie, Cranford, N.J., assignors to Esso Research and Engineering Company, a corporation of Delaware No Drawing. Filed Feb. 8, 1956, Ser. No. 564,125

7 Claims. (Cl. 204—154)

This invention relates to an improved process for polymerizing styrene and more particularly relates to a novel process for polymerizing styrene contained in aromatic hydrocarbon mixtures by subjecting these mixtures in aqueous emulsion to high intensity ionizing radiation.

Polystyrene is employed extensively today for the manufacture of molded and extruded plastics. Generally polystyrene is produced commercially by polymerizing styrene at elevated temperatures in the presence of chemical catalysts such as benzoyl peroxide or other peroxide type catalysts. The styrene employed in the polymerization process is generally obtained by the dehydrogenation of ethyl benzene. It is important in the above-mentioned polymerization process to employ a feed stock containing a very high concentration of styrene (usually greater than 98 volume percent). As the product stream from the ethyl benzene dehydrogenation process generally contains less than about 50 volume percent styrene, it is thus necessary to separate and concentrate the styrene in this product stream from the remainder of the stream which is predominantly ethyl beneze.

It is necessary to remove most of the ethyl benzene from the feed to the styrene polymerization process for several reasons. More particularly, ethyl benzene acts as a chain-stopper in the chemical polymerization process and thus makes it difficult to get the desired high molecular weight polystyrene product. Also, the presence of relatively large amounts of ethyl benzene reduces the amount of conversion of styrene to polystyrene. In addition to reducing the yield of polystyrene product, the decreased styrene conversion is deleterious for another reason. Mor particularly, the ethyl benzene in the polymerization product stream is preferably recycled to the dehydrogenation process. The presence of substantial amounts of unpolymerized styrene monomer in this recycle stream causes undesirable coking in the dehydrogenation unit.

The aforementioned difficulties can be alleviated to a certain extent by vacuum superfractionation to obtain essentially pure feed stocks to the dehydrogenation and polymerization processes. However, such distillation methods on a commercial scale are very expensive and extremely complicated because of the small difference in boiling points between styrene and ethyl benzene and also because of the reactive nature of styrene. There is thus a need for a simple and effective method for preparing polystyrene from styrene obtained by the dehydrogenation of ethyl benzene, which method does not require expensive and complicated methods of feed stock purification.

There are also a number of streams available in refineries which contain ethyl benzene in relatively dilute concentration. These streams usually contain other aromatic hydrocarbons such as xylenes in relatively high concentrations. It is not economically practical to separate ethyl benzene (to obtain a fraction having a high ethyl benzene concentration) from such streams due to the exceedingly small difference in boiling points between ethyl benzene and ortho, meta and para xylenes. For the same reason, styrene obtained by the dehydrogenation of ethyl benzene in such mixtures cannot be effectively separated from the unconverted ethyl benzene and xylenes. The following table points out the closeness of boiling points:

| Component: | (B,P., °F.) @ 760 mm. Hg |
|---|---|
| Styrene | 294.6 |
| o Xylene | 292.0 |
| m Xylene | 282.4 |
| p Xylene | 281.0 |
| Ethyl benzene | 277.1 |

Such streams as described above containing ethyl benzene and xylenes are available presently in relatively large quantities in refineries as product streams from hydroforming units. Presently these streams are incorporated into gasolines, although it would be more desirable (except for the extremely complicated and expensive separation steps involved) to employ the ethyl benzene as a raw material in the manufacture of polystyrene. There is thus also a need for a simple and effective process whereby the ethyl benzene in such streams can be dehydrogenated to produce styrene, and the styrene then polymerized without the requirement for separating the styrene from the remainder of the reaction mixtures.

A novel and improved method has now been found for polymerizing styrene contained in relatively dilute concentrations in aromatic hydrocarbon mixtures. More particularly, the improved method of the present invention comprises subjecting the aromatic hydrocarbon mixture containing styrene in aqueous emulsion to high intensity ionizing radiation. The present method requires a relatively low radiation dosage to effectively polymerize the styrene at high conversions and high conversion rates in such aromatic hydrocarbon mixtures. The present invention is particularly useful in polymerizing styrene which is contained in minor proportions in $C_8$ aromatic hydrocarbon mixtures. Such mixtures may be readily obtained, as described above, by the dehydrogenation of high purity ethyl benzene and by the dehydrogenation of ethyl benzene contained in cuts from hydroforming units. The present method does not require any intermediate separation steps to obtain high feed stock purification as is required by prior art methods. It is essential to the present process that the irradiation of the aromatic hydrocarbon mixture be carried out in aqueous emulsion. Preferably the irradiation is effected by gamma rays or a combination of gamma rays and neutrons.

The results obtained by the method of the present invention are quite surprising. It has been known heretofore that styrene and certain other monomers can be polymerized by means of high intensity ionizing radiation and also that such polymerization may be carried out usually more effectively in water emulsion. However, it was also found that the use of a solvent or diluent, such as a hydrocarbon oil (e.g., petroleum white oil), greatly reduced the effectiveness of the radiochemical polymerization of monomers in aqueous emulsion. In fact, the advantage gained in conversion rate by the use of aqueous emulsion was completely nullified when the monomer was dissolved in a hydrocarbon solvent. Therefore, it was indeed surprising to find that styrene contained in dilute concentration in aromatic hydrocarbon mixtures, particularly in $C_8$ aromatic hydrocarbon mixtures, could be as effectively polymerized in aqueous emulsion as could pure styrene itself.

Generally the feed stocks employed in the present polymerization process are predominantly aromatic hydrocarbon mixtures containing styrene. More particularly, the preferred feed stocks are $C_8$ aromatic hydrocarbon mixtures containing minor proportions of styrene. Generally, for practical purposes, it is desirable that such feed stocks contain at least about 2 volume percent and preferably at least 5 volume percent styrene. Generally, the feed stocks will contain about 5 to 50% by volume of styrene and more preferably about 20 to 50% or more by volume of styrene when the feed stock is obtained as the product stream from the dehydrogenation of high purity ethyl benzene. When the feed stocks are obtained by the dehydrogenation of ethyl benzene in $C_8$ aromatic hydrocarbon mixtures from hydroforming units, the feed stock will generally contain about 2 to 15% by volume of styrene and preferably about 5 to 15% or more by volume of styrene.

The preparation of ethyl benzene by alkylating benzene with ethylene is well known in the art. For example, see U.S. Patents 2,373,062, 2,373,030, 2,373,031, 2,377,243, 2,384,295, 2,385,187 and 2,404,104. A high purity product can be readily separated from the alkylation reaction mixture. Generally an ethyl benzene product containing at least 98 to 99% by volume of ethyl benzene can be readily obtained. $C_8$ aromatic hydrocarbon mixtures can also be obtained as cuts from hydroforming units. Generally these hydroforming cuts will contain about 10 to 30 volume percent of ethyl benzene and about 70 to 90% by volume of xylene (generally equilibrium mixtures of ortho, meta and para xylenes). It may be also practical, in some cases, to prepare ethyl benzene concentrates from this stream to contain 30–75% ethyl benzene (dehydrogenation of this concentrate will generally yield a product containing about 5 to 45% by volume of styrene).

In accordance with the present invention, such aromatic hydrocarbon mixtures as described in the previous paragraph are passed to a dehydrogenation zone wherein the ethyl benzene is dehydrogenated to form styrene. Generally up to about 60% by volume of the ethyl benzene in the feed may be converted to styrene in such processes. Usually about 20 to 50% by volume of the ethyl benzene in the feed is converted to styrene. The dehydrogenation of ethyl benzene to obtain styrene is well known in the art. Both thermal and catalytic dehydrogenation processes may be employed. However, preferably the dehydrogenation is accomplished by the use of dehydrogenation catalysts. Such ethyl benzene dehydrogenation processes are described in U.S. Patents 1,985,844, 2,110,833 and 2,395,875. A particularly effective process for dehydrogenating ethyl benzene is described in U.S. Patent 2,395,875. The dehydrogenation catalyst employed in this process has the following general composition:

| Component: | Percent by weight |
|---|---|
| MgO | 50–95 |
| $Fe_2O_3$ | 3–49 |
| Promoter | 0.5–10 |
| Stabilizer | 0.5–20 |

One especially effective catalyst of this type has the following approximate composition:

| Component: | Percent by weight |
|---|---|
| MgO | 72.4 |
| $Fe_2O_3$ | 18.4 |
| $K_2O$ | 4.6 |
| CuO | 4.6 |
| | 100.0 |

In carrying out the process using catalysts of the type above described, the hydrocarbon, preferably diluted with steam, is passed over the catalyst at a rate between 50 and 5000, preferably between 100 and 1000 volumes (measured at normal temperature and pressure) of hydrocarbon per volume of catalyst per hour. The ratio of steam to hydrocarbon is between 15:1 and 1:1, preferably from 8:1 to 4:1. The reaction chamber is maintained at a temperature between 1000 and 1600° F., preferably between 1100 and 1300° F., and under atmospheric, below atmospheric or above atmospheric pressure.

The products obtained by dehydrogenating ethyl benzene in the above-described feed stocks are then employed per se in the next step of the present process wherein these products are subjected to high intensity ionizing radiation in aqueous emulsion. The concentration of the aromatic hydrocarbon mixture (which contains styrene) in the aqueous emulsion will generally be about 5 to 50 weight percent, preferably about 10 to 40 weight percent, the remainder being an aqueous medium. In the aqueous emulsions employed in this invention, the hydrocarbon is in the disperse phase. The aqueous emulsion may be set up by means of ultrasonic machines, but preferably by the use of emulsifying agents. Generally it will be desirable to use about 0.01 to 10% by weight, based on the water, of an emulsifying agent. Any of the well-known emulsifying agents for forming hydrocarbon-water emulsions may be employed. Specific examples of such emulsifying agents include nonionic dispersants such as polyethylene glycol esters of fatty acids or mixed fatty-acid-alkanolamine condensates: cationic dispersants such as tertiary amines: and anionic dispersants such as alkali metal salts of naphthenic acids or fatty acids; alkali metal or amine salts of alkyl sulfates, alkyl sulfonates or alkyl aryl sulfonates; and sulfonated fatty amides. The particular emulsifying agent employed has essentially no effect per se on the effectiveness of the present irradiation, except insofar as the emulsifying agent affects the size of the hydrocarbon droplets in the emulsion. Emulsifying agents which promote the formation of smaller hydrocarbon droplets are preferred as the presence of small droplets in general increases the effectiveness of the present polymerization process. Preferred emulsifying agents belong to the classes of alkali metal salts of fatty acids (e.g., sodium oleate), alkyl sulfates and alkyl or alkyl aryl sulfonates.

In carrying out the present styrene polymerization process, the high energy ionizing radiation may be supplied by naturally occurring radioactive materials, such as radium and its daughters, which emit alpha, beta and gamma rays. Fission by-products of processes generating atomic power and/or fissionable materials which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, plutonium and other fissionable material in an atomic reactor.

Materials made radioactive by exposure to neutron radiation, such as radioactive cobalt[60], europium[152] or europium[154] which emit gamma rays, may likewise be used. Sources of high velocity electrons such as the beams of electron accelerators (e.g., Van de Graaf generator or the betatron) may also be employed. In general, however, high intensity gamma radiation and its well-known sources, such as nuclear fission by-products and materials made radioactive by neutron radiation are particularly preferred for the purpose of the invention mainly because of the relatively high penetrating power of the gamma rays and the availability and ease of application of these sources of gamma radiation. Also a combination of gamma rays and neutrons is a preferred type of radiation. Such combinations of gamma rays and neutrons are readily available from atomic piles (or nuclear reactors).

The present irradiation is generally carried out at temperatures in the range of about 30° to 210° F., preferably about 60° to 90° F. It is generally most convenient to operate at about room or atmospheric temperature. Usually the present irradiation will be carried out at atmospheric pressure although it will be understood that higher or lower pressures may be employed if desired. The polymerization of styrene in the present process may be carried out on either a batch or continuous basis as desired. The reaction mixture, that is, the aqueous emulsion of the aromatic mixture containing styrene, may be thoroughly agitated during the irradiation, if desired.

Relatively small dosages of radiation are required to effectively polymerize the styrene in the present polymerization process. The time required to effect the polymerization of styrene to a given conversion level will, of course, depend upon the radiation dosage rate which is available. However, times generally in the range of about 1 minute to 10 hours, usually about 5 minutes to 1 hour, will be employed. Generally the radiation dosage employed in the present invention for irradiating the emulsion will correspond to about $10^4$ to $5 \times 10^6$ roentgens, preferably about $5 \times 10^4$ to $10^6$ roentgens of gamma rays. Dosage rates of about $10^4$ to $5 \times 10^7$ (e.g., about $5 \times 10^4$ to $5 \times 10^6$) roentgens/hour and radiation sources of about 250 to $3 \times 10^6$ (e.g., $10^4$ to $10^6$) Curie-mev. will generally be employed. (Curie-mev. is a unit of energy emitted by a radioisotope in a given time.) It will be understood that alpha, beta, neutron or gamma radiation or combinations thereof may also be employed corresponding to the above-specified dosages. For example, corresponding dosages for an atomic pile (or nuclear reactor) producing combined gamma and neutron radiation would be about $5 \times 10^{11}$ to $2.5 \times 10^{14}$, preferably about $2.5 \times 10^{12}$ to $5 \times 10^{13}$ mev./gram (million electron volts per gram of emulsion).

The present polymerization process has a number of advantages over conventional styrene polymerization processes in addition to those mentioned heretofore. More specifically, these advantages include: (1) The present polymerization process is generally less expensive. This economic advantage is derived in part from the ready availability of large quantities of fission by-products from atomic reactors. Also the present polymerization can be conveniently carried out at about room temperature and atmospheric pressure. (2) The present polymerization process is more easily controlled. More particularly, the present polymerization does not require chemical polymerization catalysts which are relatively erratic and depend upon little understood secondary chemical changes and are also quite sensitive to temperature, etc. On the other hand, the radiation employed in the present invention is essentially constant. (3) There is no catalyst contamination in the polystyrene produced in the present process. The absence of catalyst contamination in the final polystyrene product results in generally higher thermal stability in the polymer. (4) The present polymerization process is generally more readily adaptable to a continuous process. For example, the present polymerization process can be easily carried out on a 24-hour basis by pumping a stream of the hydrocarbon-water emulsion continuously through the radiation given out by a suitable source.

Upon completion of the above-described radiochemical polymerization step, the polystyrene product may be readily separated from the remainder of the reaction mixture by any of the conventional methods for separating solids from liquids. For example, in certain cases the polystyrene product will have coagulated during irradiation with separation from the emulsion phase. Here the solid polystyrene may be isolated by filtration or decantation from the liquid portion of the reaction mixture. In other cases the polystyrene product may remain dispersed as an emulsion in the aqueous phase during and after irradiation. In these cases the emulsion may be broken by the addition of salts such as sodium chloride, sodium sulfate, alum or the like along with several volumes of alcohol (methanol, ethanol, or isopropanol, for example). The solid polystyrene which coagulates is removed by filtration or decantation. The separated polystyrene product obtained in either case may be then washed for example, with water followed by various alcohols such as methanol, ethanol, isopropanol and the like and then stripped and dried by heating at a temperature of about 50° C. to 100° C., preferably under vacuum. By means of the present polymerization, about 20 to 100, preferably about 80 to 99 volume percent of the styrene is converted to polystyrene having a molecular weight generally of about 2,000 to 300,000, usually about 10,000 to 100,000 Staudinger.

The separated liquid portion of the polymerization mixture may then be distilled to separate the inert hydrocarbon diluent (ethyl benzene and xylenes) and unpolymerized styrene for recycle for further processing. In cases where alcohols were added to the aqueous emulsion during isolation of the polystyrene, distillation will also serve to separate the alcohols from the other components of the mixture. The separated hydrocarbon layer (which contains some ethyl benzene originally present in the feed to the radiochemical polymerization process) may then be recycled to the dehydrogenation process if desired in order to convert a portion of this ethyl benzene to styrene. The resultant recycled and dehydrogenated stream may then be fed to the present radiochemical polymerization process if desired to polymerize the styrene.

Although the present process has been described in connection with the polymerization of styrene in aromatic hydrocarbon mixtures, it will be understood that related compounds of styrene may be likewise polymerized by the present process. Thus aromatic hydrocarbon mixtures containing dilute concentrations of unsaturated aromatic hydrocarbons, that is, aromatic olefins and relatively large proportions of saturated aromatic hydrocarbons may likewise be employed as feed stocks for the present process. Specific examples of such other aromatic olefins include methyl styrenes (obtained by the dehydrogenation of methyl ethyl benzenes) or divinyl benzene (obtained from the dehydrogenation of diethyl benzene).

The invention will be more fully understood by reference to the following example. It is pointed out, however, that the example is given for the purpose of illustration only and is not to be construed as limiting the scope of the present invention in any way.

EXAMPLE

The following reaction systems were subjected to gamma rays:
    Reaction System A:
        100 percent pure styrene
    Reaction System B:
        30 wt. percent styrene
        70 wt. percent styrene
    Reaction System C:
        3 wet. percent styrene
        97 wt. percent soap solution The soap solution contained 5 wt. percent Duponol G (an anionic surface-active agent prepared from a higher alcohol sulfate), 2.8 wt. percent sodium oleate and 92.2 wt. percent water. This system was in the form of an aqueous emulsion which was obtained by simply mixing the styrene and soap solution together, and gently agitating the mixture for several minutes. The emulsion which resulted was completely stable over a period of at least a month.

Reaction System D (present invention):
        3 wt. percent styrene
        7 wt. percent xylene
        90 wt. percent soap solution The soap solution was the same as that described above. This system was also an aqueous emulsion and was also obtained as described above.

The irradiations of the above systems with gamma rays were carried out at a temperature of 74° F. Each reaction system was divided into several portions and each portion was placed in a small bottle which was tightly sealed. These samples were then irradiated by placing them in aluminum canisters in the center of cylindrical cobalt[60] sources. Two sources were used in these experiments, one delivering a radiation intensity of 90,000 roentgens/hour in the center of the source, and one delivering 333,000 roentgens/hour. For convenience, samples receiving a low total dose of radiation were exposed in the weaker source, and samples receiving a total dose of $1 \times 10^6$ roentgens or more were exposed in the stronger source. The time during which the samples were irradiated was adjusted so that each portion of a given reaction system received a different total dose of ionizing radiation.

After irradiation, the polystyrene product was isolated in every case by precipitating the sample in methanol. The polymer was coagulated by heating, isolated by filtration, washed with more methanol and dried. Conversion was determined by weighing the polymer product, and the polymerization rate (percent conversion/roentgen of ionizing radiation) was established by plotting the conversion against the amount of radiation received by the sample.

The results of the above-described irradiation experiments were as follows:

*Gamma initiated polymerization of styrene at 74° F.*

| Name | Reaction System (wt. percent) | | | Type of Emulsion | Polymerization Rate Relative to Styrene Alone |
|---|---|---|---|---|---|
| | Styrene | Xylene | Soap Solution [1] | | |
| A | 100 | | | | 1 |
| B | 30 | 70 | | | 0.5 |
| C | 3 | | 97 | Monomer in water | 360 |
| D [2] | 3 | 7 | 90 | Solvent-monomer in water | 350 |

[1] 5% Duponol G, 2.8% sodium oleate in water.
[2] Present invention.

The conversion of styrene to polystyrene in Reaction System D (present invention) amounted to about 50% after exposure to only $10^5$ roentgens of gamma radiation forming a polystyrene product which, as isolated by precipitation into methanol, was a white hard powder of about 15,000 molecular weight (Staudinger). By comparison the conversion of styrene to polystyrene in Reaction System B (30% styrene in xylene) was only about 15% after exposure to $10^7$ roentgens of gamma radiation.

In other experiments, it had been found that the polymerization rate of vinyl-2-ethyl hexoate under the influence of gamma radiation was increased sixfold when the polymerization was carried out in water emulsion using pure vinyl-2-ethyl hexoate. However, no such acceleration in rate was found when a solvent (a petroleum white oil) was present together with the monomer in the disperse phase. In this case, the reaction proceeded as if no water at all had been present in the polymerization system. In other words, the addition of the solvent white oil nullified the beneficial effects of carrying out the polymerization reaction in aqueous emulsion.

The above data show that, while the radiation initiated polymerization of various monomers can be accelerated by carrying out the reaction in an aqueous emulsion, it is indeed surprising to find that the same degree of acceleration is obtained, in the case of styrene, when an essentially inert hydrocarbon diluent is also present along with the styrene in the disperse phase of an aqueous emulsion.

What is claimed is:

1. A polymerization process which comprises dehydrogenating ethyl benzene in a predominantly aromatic hydrocarbon refinery feed stock to obtain a product stream containing in the range of about 2 to 50 volume percent of styrene, subjecting said styrene-containing stream in aqueous emulsion to a total dosage of high energy ionizing radiation corresponding to in the range of $10^4$ to $5 \times 10^6$ roentgens, separating from said emulsion a polymer having a molecular weight in the range of 2,000 to 300,000 Staudinger in a yield in the range of 20 to 100 percent based on the weight of said styrene, and recycling unreacted ethyl benzene and styrene for further processing.

2. A polymerization process which comprises dehydrogenating ethyl benzene in a refinery feed stock consisting essentially of $C_8$ aromatics to obtain a product stream containing in the range of about 2 to 50 volume percent of styrene, forming an emulsion consisting essentially of said product stream with in the range of 50 to 95 weight percent of water, said stream being in the dispersed phase in said emulsion, subjecting said emulsion to a total dosage of high energy ionizing radiation corresponding to in the range of $10^4$ to $5 \times 10^6$ rotentgens, separating from said emulsion a polymer having a molecular weight in the range of 2,000 to 300,000 Staudinger in a yield in the range of 20 to 100 percent based on the weight of said styrene, and recycling unreacted ethyl benzene and styrene for further processing.

3. The process of claim 2 wherein said emulsion contains in the range of 0.01 to 10 weight percent of an emulsifying agent based on the weight of said water.

4. The process of claim 2 wherein said emulsion is subjected to said ionizing radiation at a temperature in the range of 30° to 210° F.

5. The process of claim 2 wherein said high energy ionizing radiation comprises gamma radiation.

6. A polymerization process which comprises dehydrogenating an alkyl-substituted aromatic selected from the group consisting of ethyl benzene, methyl ethyl benzene, and diethyl benzene, in a predominantly aromatic hydrocarbon refinery feed stock to obtain a product stream containing in the range of about 2 to 50 volume percent of the corresponding aromatic olefin, subjecting said stream in aqueous emulsion to a total dosage of high energy ionizing radiation corresponding to in the range of $10^4$ to $5 \times 10^6$ roentgens, and separating from said emulsion a polymer having a molecular weight in the range of 2,000 to 300,000 Staudinger in a yield in the range of 20 to 100 percent based on the weight of said styrene.

7. A polymerization process which comprises dehydrogenating ethyl benzene in a feed stock containing 10 to 30 volume percent of ethyl benzene and 70 to 90 volume percent of xylene to obtain a product stream containing in the range of about 2 to 15 volume percent of styrene, subjecting said styrene-containing stream in aqueous emulsion to a total dosage of high energy radiation corresponding to in the range of $10^4$ to $5 \times 10^6$ roentgens, separating from said emulsion a polymer having a molecular weight in the range of 2,000–300,000 Staudinger in yields in the range of 20 to 100 percent based on the weight of said styrene and recycling unreacted ethyl benzene and styrene for further processing.

References Cited in the file of this patent

UNITED STATES PATENTS

| | | |
|---|---|---|
| 2,395,875 | Kearby | Mar. 5, 1946 |

FOREIGN PATENTS

| | | |
|---|---|---|
| 665,262 | Great Britain | Jan. 23, 1952 |
| 1,079,401 | France | May 19, 1954 |
| 1,111,725 | France | Nov. 2, 1955 |

OTHER REFERENCES

Chapiro, III: "J. de Chimie Physique," vol. 47, pp. 747–763 (1950).

Chapiro, II: "Compte Rendu," vol. 233, pp. 792–4, October 8, 1951.

Ballantine B.N.L. 294, pp. 1–3, June 1954.